United States Patent [19]

Moore

[11] Patent Number: 4,796,415
[45] Date of Patent: Jan. 10, 1989

[54] DOLLY FOR LINE TRIMMING APPARATUS

[76] Inventor: Mark R. Moore, 268 Settlers Park Dr., Shreveport, La. 71115

[21] Appl. No.: 112,374

[22] Filed: Oct. 26, 1987

[51] Int. Cl.$^4$ ...................... A01D 34/67; A01D 34/46
[52] U.S. Cl. ...................................... 56/16.9; 56/16.7; 56/255
[58] Field of Search ...................... 56/16.7, 16.9, 17.2, 56/17.5, 255, 256; 280/47.24

[56] References Cited

U.S. PATENT DOCUMENTS

| | | | |
|---|---|---|---|
| 2,942,397 | 6/1960 | Clark | 56/16.9 |
| 4,182,100 | 1/1980 | Letter | 56/16.7 |
| 4,287,709 | 9/1981 | Lowry et al. | 56/16.9 |
| 4,411,126 | 10/1983 | Lowry et al. | 56/17.2 |
| 4,428,183 | 1/1984 | Lowry et al. | 56/17.2 |
| 4,442,659 | 4/1984 | Enbusk | 56/12.7 |
| 4,531,350 | 7/1985 | Hathmacher | 56/17.5 |
| 4,688,376 | 8/1987 | Wolfe, Sr. | 56/17.2 |
| 4,704,849 | 11/1987 | Gilbert et al. | 56/17.5 |

Primary Examiner—Paul J. Hirsch
Attorney, Agent, or Firm—John M. Harrison

[57] ABSTRACT

A dolly for receiving a line trimming apparatus and maintaining the rotating spool in the line trimming apparatus in a selected orientation with respect to the ground, in order to cut the grass at a selected height above the ground regardless of the contour of the terrain, trim the grass adjacent a structure such as a fence and edge along fixed structures such as a driveway and sidewalk. In a first preferred embodiment, a universal dolly is characterized by a split frame provided with removable front and rear legs and removable side legs for selectively receiving wheels and supporting the dolly in rolling relationship on a lawn, driveway or sidewalk. In a second preferred embodiment, an injection-molded plastic dolly is also characterized by a split frame and removable front rear and side legs to facilitate optional configurations for operation of the line trimmer in mowing, trimming and edging configurations. In yet another preferred embodiment of the invention, a dolly base of selected configuration is characterized by two or three wheels and is designed to mount a line trimmer for edging and lawn mowing purposes.

19 Claims, 3 Drawing Sheets

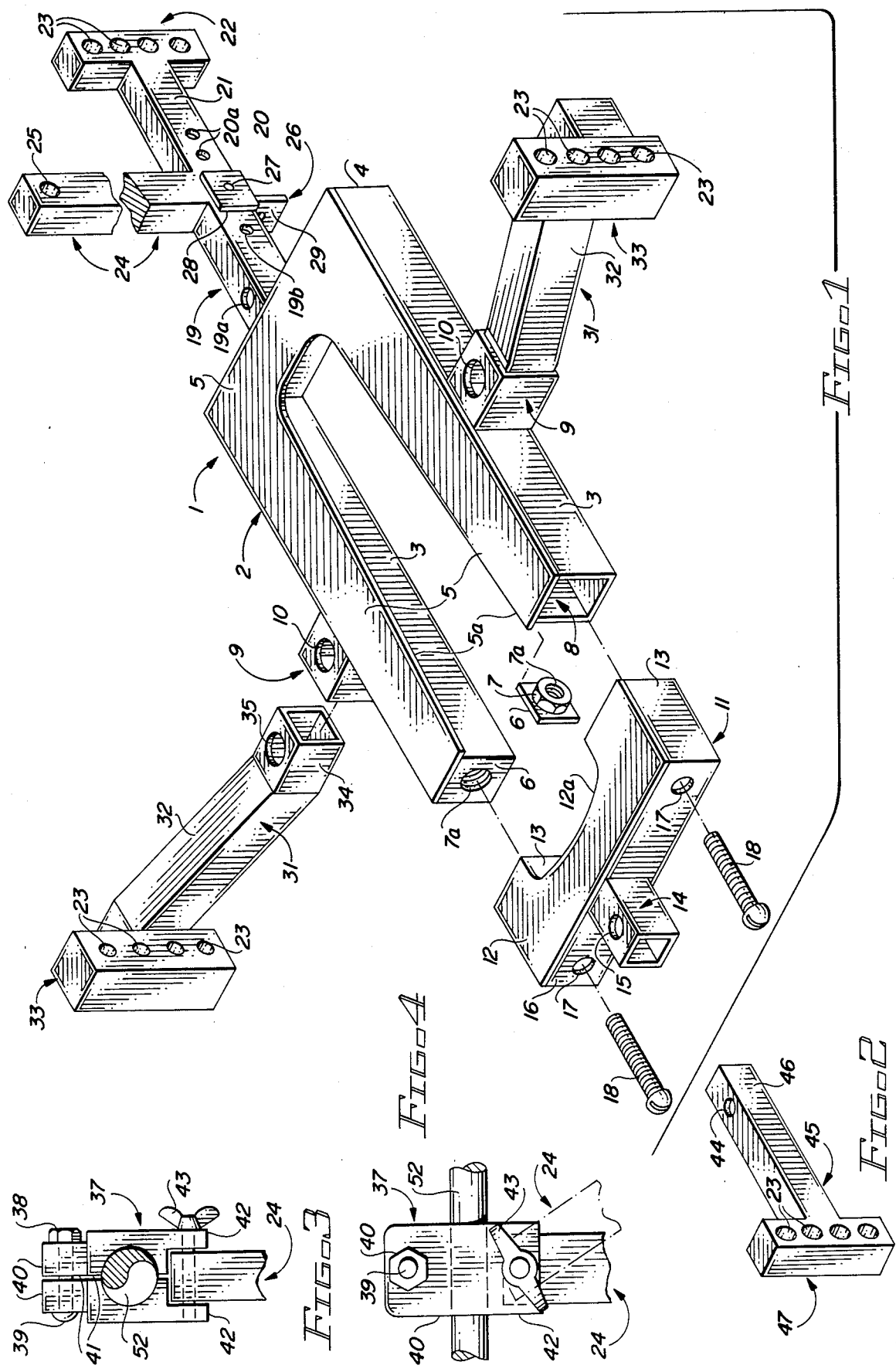

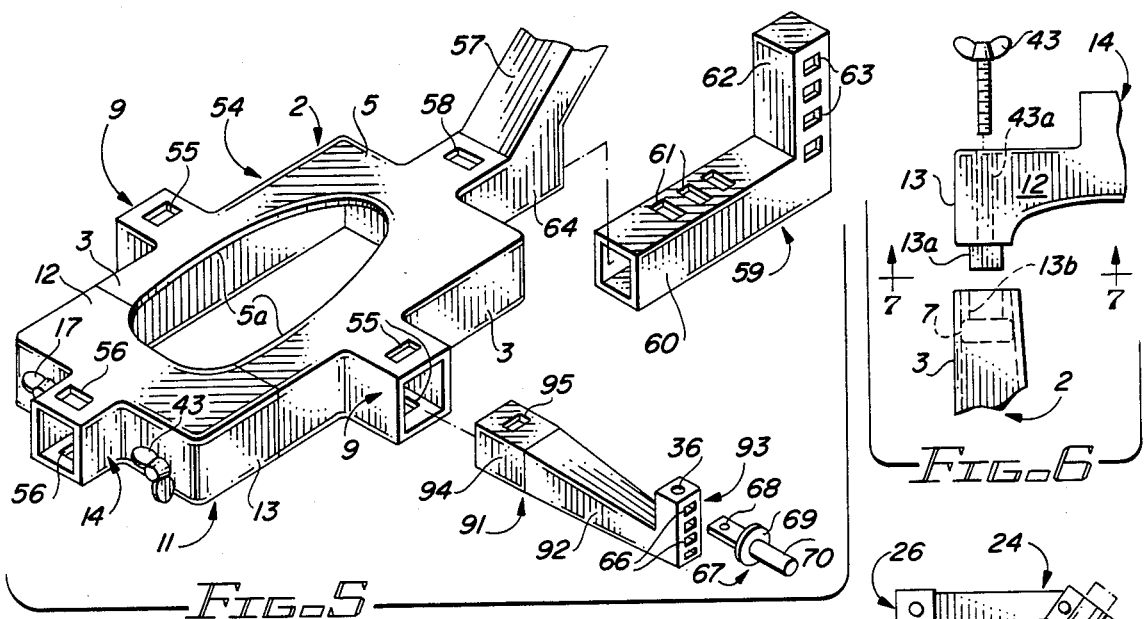
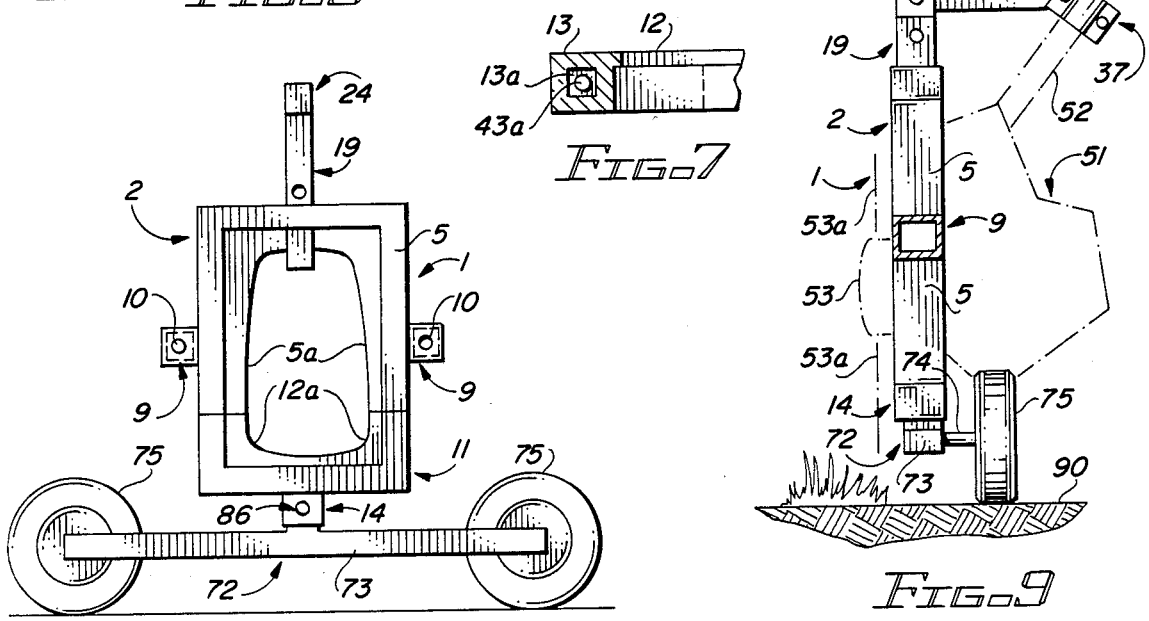
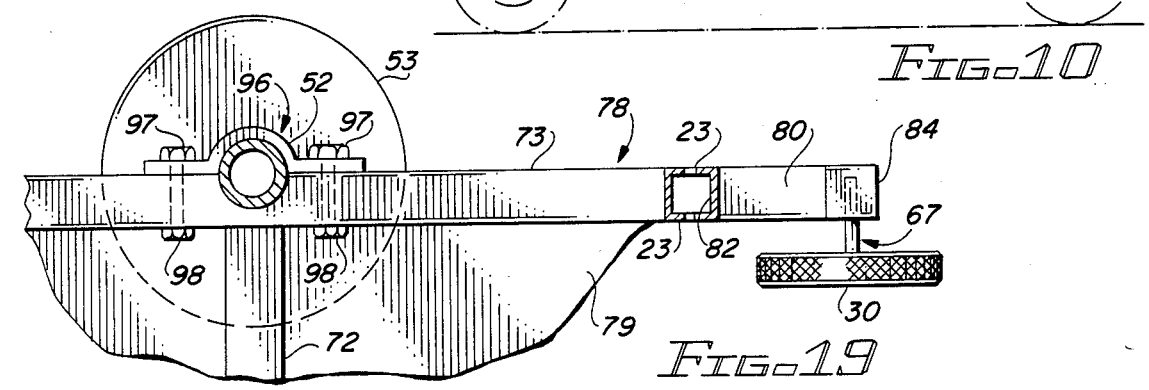

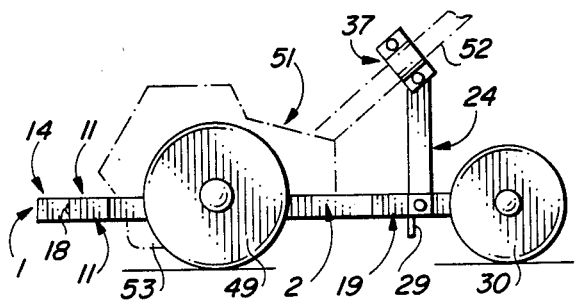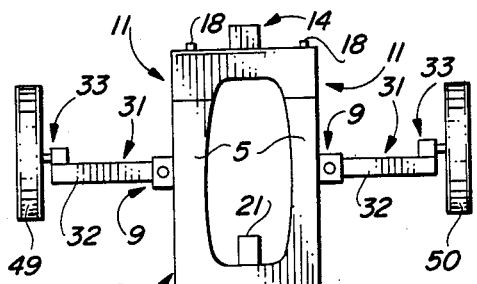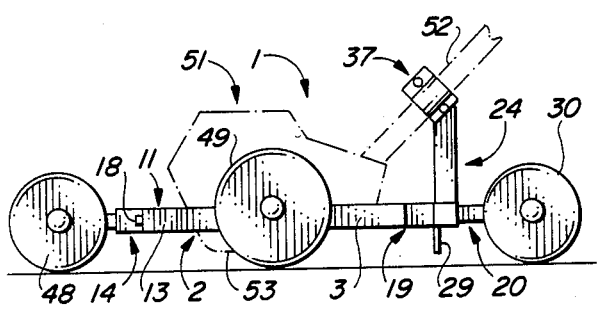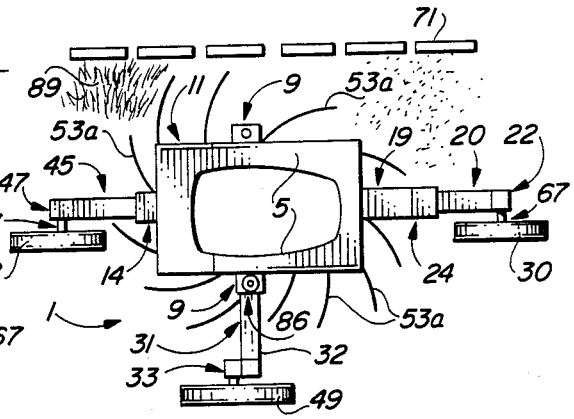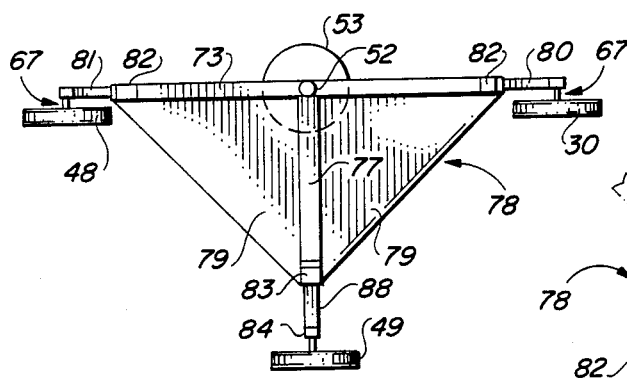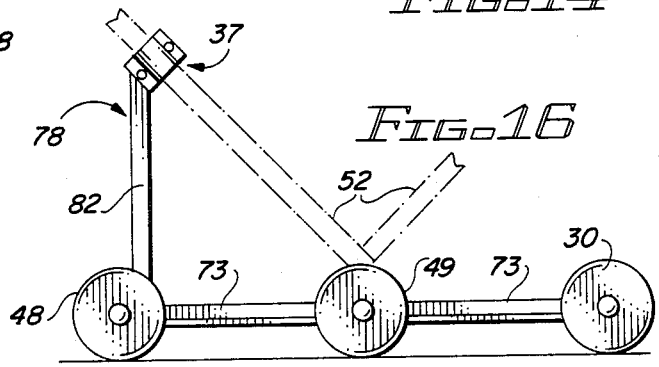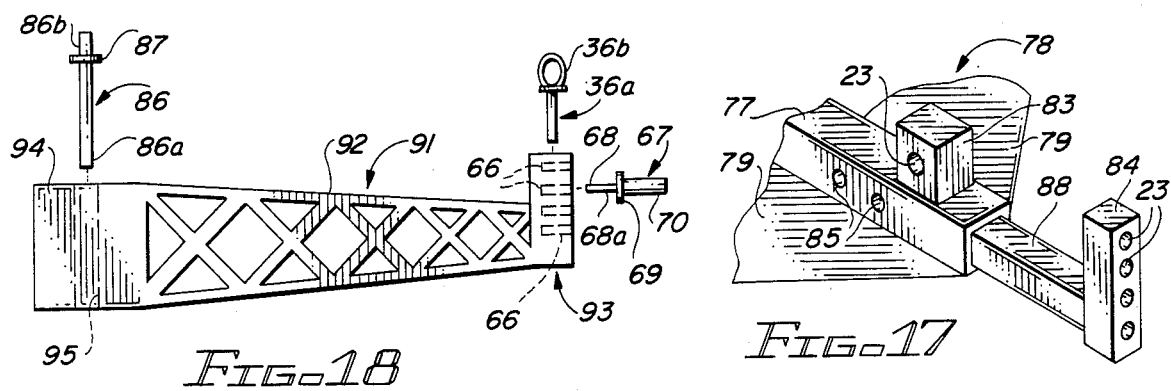

DOLLY FOR LINE TRIMMING APPARATUS

BACKGROUND OF THE INVENTION

1. Field of the Invention

This invention relates to line trimming devices and more particularly, to a dolly for receiving and mounting a line trimming device or apparatus and mowing, edging and trimming a lawn by operation of the line trimming apparatus. The dolly of this invention is broadly characterized by a universal dolly adapted for receiving a gasoline-powered line trimmer, a molded plastic dolly which is designed to receive and carry an electric line trimmer and dolly base members which are adapted to receive either an electric or a gasoline-powered line trimmer for various lawn mowing, trimming and edging functions.

One of the problems which exists in the use of conventional electric and gasoline-powered lawn mowers is that of cutting grass to a uniform height on lawns characterized by uneven terrain. Since the spacing between the front and rear wheels of a conventional lawn mower typically ranges from about 18 inches to about 30 inches, depending upon the lawn mower design, grass which is cut from the top of small hummocks and hills, as well as on other uneven terrain is frequently shorter than that cut on level terrain or in small valleys. Nor is this problem alleviated by cutting the grass in a direction perpendicular to the normal direction of lawn mower travel, since the width of the wheels ranges from about 8 inches to about 24 inches and this distance mandates cutting the grass either higher or shorter than desired, depending upon the nature of the terrain traversed by the lawn mower.

Conventional line trimmers such as the line trimmer marketed under the well known "Weed Eater" trademark are frequently used to trim grass in inaccessible areas where lawn mowers cannot be operated or in hilly or irregular areas where the terrain will not permit a lawn mower to cut the grass at a uniform height. However, since line trimmers are held by hand, cutting of the grass to a uniform height in such areas is extremely difficult and frequently results in "scalping" of the lawn or cutting and trimming the grass unevenly in these areas.

2. Description of the Prior Art

Line edgers and trimmers have long been known and used for trimming and edging lawns and other grassy and weed-infested areas. Typical of these devices are the devices disclosed in U.S. Pat. Nos. 4,047,299, and 3,859,776. Accessory devices are also used in connection with "edgers" and line trimmers and typical of these devices is the attachment described in U.S. Pat. No. 3,587,749, dated June 28, 1971, to Gerald P. Sauer, entitled "A Lawn Edger Attachment For A Power Saw". In this patent the saw blade of an electric power saw is replaced with a two-side ground cutter blade and the power saw is attached to and carried by a wheeled carrier. A shoe on the power saw is attached to a base plate of the carrier and the shoe and cutter blade are adjustable relative to each other, in order to adjust the blade cutting height. A pivotally-mounted handle, by which the carrier may be pushed, carries a switch for stopping and starting the electric motor which drives the saw. The carrier base plate is supported on three wheels for ease of turning and maneuvering. An "Attachment For Line Trimmer" is disclosed in U.S. Pat. No. 4,224,784, dated Sept. 30, 1980, to Lee A. Hansen. This device is designed to convert a line trimmer to an edge trimmer and includes a collar with support legs attached thereto and wheels attached to the support legs. A U-shaped brace extends between the support legs, in order to hold the support legs at an angle with respect to each other. The collar is placed loosely around the handle of an existing line trimmer and the line trimmer is inverted, in order to present the spool thereof perpendicular to the ground. The legs are inserted into the collar and the collar is then secured to the handle, with the head of the line trimmer located between the ends of the U-shaped brace. U.S. Pat. No. 4,312,178, dated Jan. 26, 1982, to Allie Callaghan, details a "Lawn Edging Machine". The patent discloses a balanced, self-propelled and manually guided lawn edger in which an edging cutter blade is positioned near the inner side and rearwardly of the larger of two traction wheels of unequal diameter, mounted on a common drive axle. The smaller traction wheel can be axially adjusted relative to the larger wheel to regulate the angle of cut adjacent to a side wall or a curbing. A "Dolly For Lawn Trimmer and Combination Thereof" is disclosed in U.S. Pat. No. 4,442,659, dated Apr. 17, 1984, to H. J. Enbusk. The patent details a trimmer supported on a dolly, each of which trimmer and dolly is provided with a handle. The operator holds the dolly handle in one hand and the trimmer handle in the other hand and the trimmer is pivotally connected to the dolly, whereby movement of the handle of the trimmer relative to the dolly handle changes the approach angle of the trimmer relative to the movement of the dolly. The pivoted connection is positioned forward of the dolly wheels, whereby raising and lowering the dolly handle effects lowering and raising of the trimmer and the corresponding depth of cut. The pivoted connection includes adjustment means to adjust the positions of the trimmer relative to the dolly. U.S. Pat. No. 4,446,680, dated May 8, 1984, to Thomas C. D'Alessandro, details a "Battery Powered Lawn Edger". The device includes a frame supported on at least three wheels, which frame securely carries one or more rechargeable wet-cell batteries, as well as a pivotally-mounted sub-assembly having a heavy duty, series-wound drive motor, a rigid edger blade mounted on the drive motor output shaft and a blade guard. Recharging may be accomplished by interconnection to a conventional automotive charging system, a battery charger or to a 115-volt power source. The blade is positioned to rotate in a plane generally perpendicular to the ground and a blade-positioning lever is pivotally attached to the main guide handle for vertical adjustment of the blade. A drive motor on-off switch attachable to the handle is also provided and a removable cover may be provided for protecting the battery energizers. One or more of the wheels may also include drive means for locomotion. U.S. Pat. No. 4,463,544, dated Aug. 7, 1984, to Anthony Carsello, et al, details an "Edger". The edger is provided with a rotatable cutting blade for trimming grass, weeds and the like. The cutting blade is driven by a motor mounted within a motor housing which is, in turn, supported for rotation about a longitudinal axis between a front wheel assembly and a rear wheel assembly. A locking mechanism is carried by the motor housing and is provided with a pair of spring-biased lugs normally received into locking recesses in the front and rear wheel assemblies to lock the motor housing into a selected rotational position and thereby lock the cutting blade at a selected angular orientation.

It is an object of this invention to provide a new and improved dolly for a line trimming apparatus, which dolly is characterized by a split frame for removably receiving the body of a line trimmer and removable wheel-carrying front, rear and side legs for adapting the line trimmer to edge, trim and mow grass.

Another object of the invention is to provide a dolly for receiving and adapting a line trimming apparatus to edge, mow and trim grass, which dolly includes a metal or injection-molded dolly frame for receiving the body of a line trimming apparatus, a dolly cap adapted for removable attachment to the frame to secure the line trimming apparatus to the frame and removable legs fitted with wheels, for selectively positioning on the dolly and converting the dolly into trim, mow and edge configurations, respectively.

Still another object of this invention is to provide a universal dolly for receiving and mounting a gasoline or an electric-powered line trimming apparatus, which dolly is characterized by removable wheels, wherein the line trimming apparatus can be utilized to mow, edge or trim a lawn or yard by operation of the dolly.

Yet another object of this invention is to provide a molded plastic dolly for receiving and mounting an electrically-operated line trimmer, which dolly includes removable front, rear and side wheels, in order to facilitate operation of the line trimmer and the dolly to mow, trim and/or edge a lawn.

Another object of this invention is to provide a wheeled dolly base which is characterized by a frame and at least two wheels rotatably mounted on the frame in spaced relationship, which frame is further adapted to receive and mount a dolly carrying a line trimmer or a line trimmer, in order to facilitate mowing, trimming and/or edging of a lawn or yard by operation of the line trimmer and the dolly base.

Yet another object of this invention is to provide a dolly base which is characterized by an elongated frame, a pair of wheels located at each end of the frame, which frame is adapted to receive and mount a line trimmer such that the line trimmer and dolly cooperate to facilitate edging of a lawn or yard.

A still further object of this invention is to provide a new and improved dolly and dolly base for receiving a line trimmer and selectively orienting the line trimmer into various configurations for mowing, edging and trimming a lawn or yard and arranging the wheel configurations on the dolly and dolly base such that line can be automatically extended from the line trimmer spool by periodically contacting the spool with the ground.

Another object of this invention is to provide a dolly base for receiving a line trimmer, which dolly base is provided with a generally triangular-shaped frame with a wheel rotatably provided at each apex of the frame and the frame adapted to receive, mount and operate the line trimmer to mow and trim a lawn.

SUMMARY OF THE INVENTION

These and other objects of the invention are provided in a wheeled dolly adapted to receive an electric or gasoline-powered line trimmer and selectively orient the line trimmer to mow, edge or trim a lawn by selectively altering front, rear and side legs provided with wheels. Also provided are dolly bases having two wheels in a first configuration and three wheels in a second configuration, for receiving a line trimmer or a dolly carrying a line trimmer and orienting the line trimmer in functional position to mow, edge or trim a lawn.

BRIEF DESCRIPTION OF THE DRAWING

The invention will be better understood by reference to the accompanying drawings wherein:

FIG. 1 is a perspective, exploded view of a preferred universal dolly for receiving and mounting a conventional line trimmer according to this invention;

FIG. 2 is a perspective view of a removable front leg for attachment to the universal dolly illustrated in FIG. 1;

FIG. 3 is a top view, partially in section, of a brace collar designed to removably attach a line trimmer shaft to the rear leg receptacle brace of the universal dolly illustrated in FIG. 1;

FIG. 4 is a side view of the brace collar illustrated in FIG. 3;

FIG. 5 is a perspective, partially exploded view of a molded dolly utilized primarily to mount and operate an electrically-powered line trimmer;

FIG. 6 is a top sectional view of a preferred technique for attaching the cap receptacle to the dolly frame of the molded dolly illustrated in FIG. 5;

FIG. 7 is an end view, taken along line 7—7, of the peg and cap end portion of the cap receptacle illustrated in FIG. 6;

FIG. 8 is a side elevation of the molded dolly mounted in perpendicular relationship to a dolly base for receiving and operating a line trimmer in edging configuration;

FIG. 9 is a front end view of the dolly base and molded dolly combination illustrated in FIG. 8;

FIG. 10 is a side elevation of the dolly base illustrated in FIGS. 8 and 9, with the molded dolly removed;

FIG. 11 is a side elevation of the universal dolly illustrated in FIG. 1, with the front wheel removed and the line trimmer mounted in lawn mowing configuration;

FIG. 12 is a top elevation of the universal dolly illustrated in FIG. 11;

FIG. 13 is a side elevation of the universal dolly illustrated in FIGS. 11 and 12, with the front wheel added to present yet another dolly configuration for lawn mowing operation;

FIG. 14 is a top elevation of the universal dolly illustrated in FIG. 13 with the right side wheel removed to illustrate a trimming function adjacent a fence;

FIG. 15 is a top elevation of a triangular dolly base adapted to receive a line trimmer for mowing and trimming functions;

FIG. 16 is a side elevation of the triangular dolly base illustrated in FIG. 15;

FIG. 17 is a perspective view, partially in section, of the side frame and side frame extension portion of the triangular dolly base illustrated in FIGS. 15 and 16;

FIG. 18 is a perspective view of a preferred removable side leg and means of mounting the side leg to the molded dolly illustrated in FIG. 5; and FIG. 19 is a top view, partially in section, of a portion of the triangular dolly base illustrated in FIGS. 15 and 16, more particularly illustrating a preferred means of mounting the line trimmer to the triangular dolly base.

DESCRIPTION OF THE PREFERRED EMBODIMENTS

Referring initially to FIGS. 1-4 of the drawings, in a first preferred embodiment of the invention a universal dolly is generally illustrated by reference numeral 1. The universal dolly 1 is characterized by a generally horseshoe-shaped dolly frame 2, which includes a frame base 4 and a pair of frame legs 3 extending from the frame base 4 in spaced relationship, as illustrated in FIG. 1. A frame plate 5 caps the frame legs 3 and the frame base 4 and the frame plate lip 5a overhangs the top surfaces of the frame legs 3 and the frame base 4, as further illustrated in FIG. 1. A pair of end plates 6 are welded or otherwise secured to a nut 7 provided with nut threads 7a and the end plates 6 are designed to seat in the extending ends of the frame legs 3, respectively, such that each of the nuts 7 project inside the leg cavity 8 of a separate frame leg 3. In a preferred embodiment of the invention, each of the end plates 6 are provided with a central opening (not illustrated) and are welded or otherwise secured to the frame legs 3, in order to facilitate removably mounting a dolly cap 11 to the frame legs 3, as further illustrated in FIG. 1. In another preferred embodiment of the invention, the dolly cap 11 is further characterized by a pair of cap end portions 13, topped by a cap plate 12 provided with a cap plate lip 12a which overhangs the cap end portions 13. A cap end face 16 terminates the front end of the dolly cap 11 and is provided with a pair of end face openings 17, which are aligned with the nut threads 7a in the nut 7 when the cap end portions 13 of the dolly cap 11 are fitted to the end plate 6 provided on the ends of the frame legs 3, further as illustrated in FIG. 1. A pair of cap bolts 18 are designed to register with the end face openings 17 in the dolly cap 11 and to threadibly engage the nut threads 7a in the nuts 7, in order to removably secure the dolly cap 11 to the frame legs 3 of the dolly frame 2. A cap receptacle 14 projects from fixed attachment to the cap end face 16 of the dolly cap 11 and is further fitted with a cap receptacle opening 15 extending vertically therethrough. Furthermore, the front leg mount bar 46 of a front leg 45 is designed to insert inside the cap receptacle 14 and the front leg 45 is further provided with a vertical front leg adjusting aperture 44, which can be aligned with the cap receptacle opening 15 to receive a pin (not illustrated) to mount the front leg 45 to the dolly cap 11. In a most preferred embodiment of the invention the front leg 45 is further characterized by a front leg adjusting bar 47, which is further provided with spaced adjusting holes 23 for receiving an axle and wheel assembly (not illustrated) at a selected height, as hereinafter further described. A pair of leg receptacles 9 extend in oppositely-disposed relationship from opposite sides of the frame legs 3, as further illustrated in FIG. 1 and each of the leg receptacles 9 are provided with a vertical leg receptacle opening 10 therein, for purposes which will be hereinafter further described. A pair of side legs 31 are each characterized by an adjusting bar neck 34 which is sized to insert into the leg receptacles 9, respectively, in order to removably mount the side legs 31 to the dolly frame 2. In another most preferred embodiment of the invention, the leg receptacle openings 10 are aligned with cooperating neck openings 35 provided in each of the adjusting bar necks 34, respectively, and a pin (not illustrated) is inserted through the registering leg receptacle openings 10 and neck openings 35 to removably secure one or both of the side legs 31 to the respective frame legs 3, as hereinafter further described. As in the case of the front leg 45, in yet another preferred embodiment of the invention, a side leg adjusting bar 33 is secured to the extending end of each of the side leg mount bars 32 and the side leg adjusting bars 33 are fitted with additional spaced adjusting holes 23 for receiving specially designed axles (not illustrated) to mount wheels (not illustrated) on the dolly frame 2 at a selected height, as hereinafter further described. As further illustrated in FIGURE 1, a rear leg receptacle 19 is welded or otherwise fixedly secured to the frame base 4 of the dolly frame 2 and the rear leg receptacle 19 projects rearwardly of the dolly frame 2 substantially in alignment with the cap receptacle 14, when the dolly cap 11 is bolted to the frame legs 3 of the dolly frame 2 by means of the cap bolts 18. Alternatively, the rear leg receptacle 19 can be fitted over a companion receptacle (not illustrated) which is welded or otherwise fixedly attached to the frame base 4. The rear leg receptacle 19 can be secured to this receptacle by projecting a pin (not illustrated) through the receptacle mount aperture 19a and a cooperating aperture (not illustrated) provided in the companion receptacle. A rear leg receptacle brace 24 extends upwardly from the extending end of the rear leg receptacle 19 and a brace opening 25 is provided in the extending end of the rear leg receptacle brace 24 for receiving a brace collar 37, as illustrated in FIGS. 3 and 4 of the drawings. A blade bracket 26, having a blade flange 28 and a blade 29 extending downwardly therefrom, is secured to the rear leg receptacle 19 by means of a pin (not illustrated) which is inserted in a bracket opening 27 extending therethrough. The rear leg mount bar 21 of a rear leg 20 projects into the rear leg receptacle 19 and a rear leg adjusting bar 22 is secured to the opposite extending end of the rear leg mount bar 21 and is provided with additional spaced adjusting holes 23, as illustrated, in order to adjust the height of the frame base 4 above the ground, as hereinafter described. The distance between the rear leg adjusting bar 22 and the parallel rear leg receptacle brace 24, secured to the rear leg receptacle 19, is fixed, although the blade bracket 26 can be adjusted along the rear leg mount bar 21 and on the rear leg receptacle 19 by extending a pin (not illustrated) through the blade flange opening 27 in the blade flange 28 of the blade bracket 26 and through the receptacle adjusting aperture 19b or through a selected one of the spaced rear leg adjusting apertures 20a, provided in spaced relationship in the rear leg mount bar 21. This adjustment facilitates cutting of the line 53a, wound on the line trimmer spool 53, illustrated in FIGS. 9 and 14, at different lengths, as desired.

Referring again to FIGS. 1-4 and 11-14 of the drawings, a conventional line trimmer 51, illustrated in phantom, is provided with a line trimmer shaft 52 and a rotating line trimmer spool 53 and a coil of line 53a is wound on the line trimmer spool 53 in conventional fashion. As illustrated in FIGS. 1, 11 and 13, the line trimmer 51 is inserted between the frame legs 3 of the dolly frame 2 with the dolly cap 11 removed and the line trimmer 51 is secured in this position by means of the projecting frame plate lip 5a in the frame plate 5. Accordingly, when the dolly cap 11 is mounted on the frame legs 3 by operation of the cap bolts 18, the line trimmer 51 is secured between the frame legs 3 with the line trimmer spool 53 and the line 53a projecting downwardly from the dolly frame 2, as illustrated in FIGS.

11 and 13. Furthermore, the line trimmer shaft 52 is secured to the upward-standing rear leg receptacle brace 24 by means of the brace collar 37, as illustrated in FIGS. 3, 4, 11 and 13. The brace collar 37 is characterized by a split housing having a collar slot 41 and includes a pair of collar flanges 40 extending from collar legs 42, respectively, which collar legs 42 are adapted to receive the extending end of the rear leg receptacle brace 24. A wing bolt 43 projects through openings drilled in the collar legs 42 and through the brace opening 25 provided in the extending end of the rear leg receptacle brace 24, to pivotally attach the brace collar 37 to the rear leg receptacle brace 24. The collar flanges 40 are secured in adjacent relationship by means of the collar bolt 38 and cooperating collar nut 39. Accordingly, as illustrated in FIGS. 3, 4, 11 and 13, the line trimmer shaft 52 is secured to the rear leg receptacle brace 24 by means of the brace collar 37 when the line trimmer 51 is securely seated in the dolly frame 2. Consequently, when the line trimmer 51 is oriented in the configurations illustrated in FIGS. 11 and 13, the universal dolly 1 is capable of operating as a lawn mower, both with the front wheel 48 mounted in functional position as illustrated in FIG. 13, and removed, as illustrated in FIG. 11. Under circumstances where the front wheel 48 is removed from the dolly frame 2 as illustrated in FIGS. 11 and 12, the line trimmer 51 and universal dolly 1 can be operated as a lawn mower and the conventional semi-automatic line extension function which is built into the line trimmer spool 53 can be triggered by tilting the dolly frame 2 forwardly responsive to upward pressure exerted on the line trimmer shaft 52, in order to contact the line trimmer spool 53 with the ground and further extend the line 53a from the line trimmer spool 53. Furthermore, as illustrated in FIG. 14 of the drawings, under circumstances where it is desired to trim the excess grass 89 growing adjacent a fence 71, the right side wheel 50 can be removed by first removing the cooperating pin such as the leg pin 86, illustrated in FIG. 18 and then the side leg mount bar 32, and the dolly frame 2 carrying the line trimmer 51 can be manuevered parallel to the fence 71 as illustrated in FIG. 14, to trim the grass 89. Additional line 53a can be periodically extended from the line trimmer spool 53 by exerting a clockwise torque on the line trimmer shaft 52 to tilt the dolly frame 2 away from the left side wheel 49 and contact the line trimmer spool 53 with the ground, as heretofore described.

Referring now to FIGS. 5, 6 and 18 of the drawings, in still another preferred embodiment of the invention a molded dolly 54 is illustrated, which molded dolly 54 is most preferably shaped from an injection-molded plastic material having sufficient structural integrity to receive and carry a line trimmer 51. Like the universal dolly 1 illustrated in FIG. 1, the molded dolly 54 is characterized by a dolly frame 2, with leg receptacles 9 projecting from oppositely-disposed frame legs 3 and a frame plate 5 molded into the frame legs 3 and overhanging the frame legs 3. A pair of leg receptacle slots 55 are provided in the leg receptacles 9 and a rear wheel mount receptacle 64 projects rearwardly from the dolly frame 2 and is fitted with a frame brace 57, which extends upwardly in angular relationship from the rear wheel mount receptacle 64. A frame brace slot 58 is provided in the rear wheel mount receptacle 64 and the rear wheel mount receptacle 64 is further designed to receive a rear wheel mount 59, provided with spaced horizontal leg slots 61, one of which horizontal leg slots 61 may be registered with the frame brace slot 58 located in the rear wheel mount receptacle 64, to secure the rear wheel mount 59 by means of a pin such as the leg pin 86, illustrated in FIG. 18, as hereinafter further described. A vertical leg 62 projects upwardly from the extending end of the rear wheel mount 59 and is fitted with multiple, spaced leg slots 63 for receiving an axle (not illustrated) and mounting a wheel at any selected height and on either side of the molded side leg mount bar 92, as further hereinafter described. Further as in the case of the universal dolly 1 illustrated in FIG. 1, an injection-molded dolly cap 11 is designed to fit on the extending ends of the frame legs 3 in the molded dolly 54 and a pair of wing bolts 43 are extended through the matching end face openings 17 provided in the cap end portions 13 of the dolly cap 11, in order to secure the dolly cap 11 to the dolly frame 2. A molded cap plate 12 is also provided in the dolly cap 11 for extending the frame plate 5 located in the dolly frame 2 and securing a line trimmer 51 in the dolly frame 2 and against the dolly cap 11, as illustrated in FIGS. 11 and 12 with respect to the universal dolly 1. A cap receptacle 14 projects from the cap plate 12 and is provided with a rectangular cap receptacle slot 56, for receiving the pin leg 86a of a leg pin such as the leg pin 86, illustrated in FIG. 18. Referring now to FIGS. 5 and 18 of the drawings, a pair of molded side legs 91 are adapted to fit on the leg receptacles 9, respectively, extending from the frame legs 3 of the dolly frame 2. Each of the molded side legs 91 is provided with a shaped molded side leg mount bar 92, fitted with a molded side leg adjusting bar 93 at the extending end thereof, which molded side leg adjusting bar 93 is further fitted with spaced adjusting bar slots 66. The opposite end of each of the molded side legs 91 are each provided with a molded adjusting bar neck 94, which is designed to insert in the leg receptacles 9, respectively, such that the neck slot 95, provided in each molded adjusting bar neck 94, registers with the corresponding leg receptacle 55, provided in the companion leg receptacle 9. A pin such as the leg pin 86 illustrated in FIG. 18, having a rectangular-shaped pin leg 86a, is then inserted in the registering leg receptacle slot 55 and neck slot 95, to removably secure the molded side legs 91 to the respective leg receptacles 9. As further illustrated in FIG. 18, the downwardly-extending pin leg 86a may be round or rectangular in configuration, in order to slidably register with the leg receptacle openings 10, cap receptacle opening 15, neck opening 35 and front leg adjusting apertures 44, provided in the leg receptacles 9, cap receptacle 14, adjusting bar neck 34 and front leg 45, respectively, as well as the receptacle mount aperture 19a, leg receptacle slot 55, cap receptacle slot 56, frame brace slot 58, horizontal leg slots 61 and neck slot 95, as illustrated in FIG. 5. Furthermore, a leg pin flange 87 divides the pin leg 86a from the pin extension 86b, which is used to insert and extract the leg pin 86. Additionally, the respective rear wheel 30, left side wheel 49, right side wheel 50 and front wheel 48 are most preferably rotatably secured to the axle bar 70 of a companion axle 67, which is fitted with a slot pin 68 having a slot pin opening 68a therein. An axle flange 69 divides each axle bar 70, which receives the front wheel 48, left side wheel 49, right side wheel 50 and rear wheel 30, respectively, from the cooperating slot pin 68. The slot pin 68 may be configured in a rectangular cross-sectional configuration, in order to slidably fit in a selected one of the adjusting bar slots 66, provided in the molded side leg adjusting bar 93 and the vertical leg 62 of the molded side leg 91 and the horizontal leg 60, respectively. Alternatively, the slot pin 68 may be round in cross-sectional configuration for insertion in the various adjusting holes 23, provided in the side leg adjusting bars 33, front leg adjusting bar 47, rear leg adjusting bar 22 and like members. Accordingly, the molded dolly 54 is capable of carrying a line trimmer 51 and operating in the same modes and under the same circumstances as the universal dolly 1, illustrated in FIGS. 11–14. A lock pin 36a is provided with a pin ring 36b and is designed to insert in the lock pin seat 36, extending through the molded side leg adjusting bar 93, as illustrated in FIG. 5, to secure the axle 67 in place.

Referring now to FIGS. 8–10 of the drawings, in still another preferred embodiment of the invention, a dolly base is generally illustrated by reference numeral 72. The dolly base 72 is characterized by an elongated base frame 73, provided with a pair of base frame axles 74 at the extending ends thereof, which base frame axles 74 rotatably receive a pair of base frame wheels 75, as illustrated. A base frame leg 76 projects upwardly from fixed attachment to the center of the base frame 73 and is fitted with multiple spaced adjusting holes 23, as illustrated in FIG. 10. The dolly base 72 is designed to receive a line trimmer 51 for edging purposes, for example, as in cutting the grass 89 away from the edges of the sidewalk 90, as illustrated in FIG. 9. Accordingly, the line trimmer 51 is mounted in the universal dolly 1 as heretofore described, with the cap receptacle 14 extended downwardly over the base frame leg 76 and a leg pin 86 inserted through the registering cap receptacle opening 15 and adjusting holes 23. Both of the side legs 31 are removed from the respective leg receptacles 9 and the line trimmer shaft 52 is secured to the rear leg receptacle brace 24 by means of the brace collar 37, as illustrated in FIGS. 3 and 4 and as heretofore described. The line trimmer 51 is then oriented in a vertical configuration, such that the line trimmer spool 53 extends over the edge of the sidewalk 90 and the line 53a is designed to cut the grass 89 from the edge of the sidewalk 90, as illustrated in FIG. 9.

In yet another preferred embodiment of the invention, a triangular dolly base 78 is illustrated in FIGS. 15–17 and 19. The triangular dolly base 78 is characterized by a base frame 73, provided with spaced extension openings 85 in the extending ends thereof and a support post 82 projecting upwardly from the extending ends thereof, respectively. In a preferred embodiment of the invention, the support post 82 may be removably attached to the extending ends of the base frame 73 by using a support post receptacle (not illustrated) such as the support post receptacle 83 provided on the extending end of the side frame 77, which is attached to the base frame 73 in perpendicular relationship, as illustrated in FIGS. 15 and 19. In a most preferred embodiment of this aspect of the invention, gussets 79 extend from both sides of the side frame 77 to the base frame 73, in order to stiffen the base frame 73. As illustrated in FIGS. 15 and 17, a side frame extension 88 is telescopically fitted to the extending end of the side frame 77 and is adjustably mounted therein by means of the extension openings 85 and cooperating openings (not illustrated) provided in the side frame extension 88. An extension bar 84 projects upwardly from the extending end of the side frame extension 88 and is fitted with spaced adjusting holes 23, for receiving an axle 67, in order to mount the left side wheel 49 at a selected height, as illustrated in FIG. 15. The rear wheel 30 and front wheel 48 are similarly mounted on the front frame extension 80 and rear frame extension 81, respectively, as illustrated in FIG. 15. Accordingly, the line trimmer shaft 52 can be secured to the upwardly-extending support post 82 as illustrated in FIG. 16, and the bottom portion of the line trimmer shaft 52 secured to the base frame 73 by means of a bracket 96 and the cooperating bracket bolts 97, fitted with bracket bolt nuts 98, as illustrated in FIG. 19.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A dolly for a line trimming apparatus comprising a dolly frame adapted to receive and mount the line trimming apparatus; cap means removably carried by one end of said dolly frame for securing the line trimming apparatus to said dolly frame and cap receptacle means provided on said cap means; first and second leg receptacle means provided on opposite sides of said dolly frame; at least two frame leg means selectively and removably carried by said first and second leg receptacle means, and said cap receptacle means, respectively, said frame leg means extending outwardly of said dolly frame and said cap means; and at least two frame wheels rotatably attached to said frame leg means, respectively, whereby said dolly frame is mobile in a selected configuration for cutting grass responsive to operation of the line trimming apparatus.

2. The dolly of claim 1 further comprising brace means carried by one or of said leg receptacle means, aid brace means adapted for engaging the line trimming apparatus and stabilizing the line trimming apparatus on said dolly frame.

3. The dolly of claim 1 wherein said at least two frame leg means further comprises a pair of elongated frame legs engaging said first and second leg receptacle means, respectively and an elongated cap leg engaging said cap receptacle means and a cap wheel rotatably attached to said cap leg, whereby said dolly is supported in lawn mowing configuration by two of said frame wheels carried by said pair of frame legs, respectively, and said cap wheel carried by said cap leg.

4. The dolly of claim 3 further comprising brace means carried by said dolly frame, said brace means adapted for engaging the line trimming apparatus and stabilizing the line trimming apparatus on said dolly frame.

5. The dolly of claim 1 further comprising wheel height adjusting means carried by said frame leg means for receiving said frame wheels and adjusting the height of said dolly frame with respect to the grass.

6. The dolly of claim 4 further comprising wheel height adjusting means carried by said frame legs and said cap leg for receiving said frame wheels and said cap wheel, respectively, and adjusting the height of said dolly frame with respect to the grass.

7. The dolly of claim 1 further comprising axle means adapted for removable engagement with said frame leg means and rotatable engagement with said frame wheels for rotatably and removably mounting said frame wheels on said dolly.

8. The dolly of claim 3 further comprising axle means adapted for removable engagement with said frame legs and rotatable engagement with said frame wheels for rotatably and removably mounting said frame wheels on said dolly and wheel height adjusting means carried by said frame legs and said cap leg for receiving said axle means and mounting said frame wheels and said cap wheel, respectively, and adjusting said height of said dolly frame and said cap means with respect to the grass.

9. The dolly of claim 3 further comprising a third leg receptacle means provided on said dolly frame in oppositely-disposed relationship to said cap receptacle means, and wherein said frame legs engage a selected one of said first and second leg receptacle means and said third leg receptacle means, respectively, whereby said dolly frame is supported by three of said frame wheels in lawn trimming configuration.

10. The dolly of claim 9 further comprising brace means carried by said third leg receptacle means, said brace means adapted for engaging the line trimming apparatus and stabilizing the line trimming apparatus on said dolly frame.

11. The dolly of claim 10 further comprising wheel height adjusting means carried by said frame legs for receiving said frame wheels, respectively.

12. The dolly of claim 11 further comprising axle means adapted for removable engagement with said frame legs and rotatable engagement with said frame wheels for rotatably and removably mounting said frame wheels on said dolly.

13. A dolly for a line trimming apparatus comprising a dolly frame and a frame plate carried by said dolly frame, said frame plate adapted to receive and mount the line trimming apparatus; cap means removable carried by one end of said dolly frame and a cap plate carried by said cap means, said cap plate adapted to engage said frame plate when said cap means is mounted on said dolly frame, for securing the line trimming apparatus in said dolly frame; brace means carried by the end of said dolly frame opposite said cap means, said brace means adapted for removably engaging the line trimming apparatus and stabilizing the line trimming apparatus on said dolly frame; and a wheeled dolly base adapted to receive said cap means and mount said dolly frame on said wheeled dolly base in substantially perpendicular relationship, whereby said dolly frame is mobile in edging configuration for cutting grass responsive to operation of the line trimming apparatus.

14. The dolly of claim 13 further comprising a pair of leg receptacles provided in oppositely-disposed relationship in the sides of said dolly frame; a third leg receptacle provided in said end of said dolly frame opposite said cap means; a cap receptacle provided in said cap means; and a base leg upward-standing from said wheeled dolly base for engaging said cap receptacle and mounting said dolly on said wheeled dolly base.

15. A dolly for a line trimming apparatus comprising an elongated dolly frame adapted to receive and mount the line trimming apparatus a pair of frame wheels journalled for rotation at each end of said dolly frame; a side frame member projecting from said dolly frame in substantially perpendicular relationship; a pair of gussets mounted on said side frame member and said dolly frame, respectively, for stiffening said dolly frame; and a side frame member wheel journalled for rotation in said side frame member for mowing and trimming grass responsive to operation of the line trimming apparatus.

16. The dolly of claim 15 further comprising brace means carried by said frame, said brace means adapted for engaging the line trimming apparatus and stabilizing the line trimming apparatus on said dolly frame.

17. The dolly of claim 15 further comprising wheel height adjusting means carried by said dolly frame and said side frame member for mounting said frame wheels and said side frame member wheel, respectively, and adjusting the height of said dolly with respect to the grass.

18. The dolly of claim 15 further comprising:
(a) brace means carried by said dolly frame, said brace means adapted for engaging the line trimming apparatus and stabilizing the line trimming apparatus on said dolly frame; and
(b) wheel height adjusting means carried by said dolly frame and said side frame member for mounting said frame wheels and said side frame member wheel, respectively, and adjusting the height of said dolly with respect to the grass.

19. The dolly of claim 18 further comprising axle means adapted for removable engagement with said dolly and said side frame member frame and rotatable engagement with said frame wheels and said side frame member wheels for rotatably and removably mounting said frame wheels and said side frame member wheels on said dolly.

* * * * *